(12) United States Patent
Tanimizu et al.

(10) Patent No.: US 9,276,390 B2
(45) Date of Patent: Mar. 1, 2016

(54) BUS BAR ASSEMBLY

(71) Applicant: KITAGAWA INDUSTRIES CO., LTD., Inazawa-shi, Aichi (JP)

(72) Inventors: Tomokazu Tanimizu, Inazawa (JP); Hideharu Kawai, Inazawa (JP); Kazushige Ueno, Inazawa (JP); Toshio Sakamoto, Inazawa (JP); Keisuke Asoh, Inazawa (JP)

(73) Assignee: KITAGAWA INDUSTRIES CO., LTD., Inazawai-Shi, Aichi (JP)

( * ) Notice: Subject to any disclaimer, the term of this patent is extended or adjusted under 35 U.S.C. 154(b) by 0 days.

(21) Appl. No.: 14/370,136

(22) PCT Filed: Sep. 30, 2013

(86) PCT No.: PCT/JP2013/076539
§ 371 (c)(1),
(2) Date: Jul. 1, 2014

(87) PCT Pub. No.: WO2014/091812
PCT Pub. Date: Jun. 19, 2014

(65) Prior Publication Data
US 2015/0008008 A1    Jan. 8, 2015

(30) Foreign Application Priority Data
Dec. 12, 2012 (JP) .................... 2012-271269

(51) Int. Cl.
*H02G 5/02* (2006.01)
*H01F 17/06* (2006.01)
*H01F 27/28* (2006.01)
*H01F 27/30* (2006.01)

(52) U.S. Cl.
CPC .............. *H02G 5/025* (2013.01); *H01F 17/06* (2013.01); *H01F 27/2847* (2013.01); *H01F 27/306* (2013.01)

(58) Field of Classification Search
CPC ...... H02G 5/025; H02G 5/02; H01F 27/2847; H01F 27/306; H01F 17/06
USPC ........................................... 174/68.2
See application file for complete search history.

(56) References Cited

U.S. PATENT DOCUMENTS 6,603,075 B1 *   8/2003   Soares et al. ............... 174/72 B
6,875,923 B2 *   4/2005   Egawa et al. ............... 174/68.2

FOREIGN PATENT DOCUMENTS

CN       1123018 C      7/1996
CN       101971425 A    2/2011
(Continued)

OTHER PUBLICATIONS

International Search Report, mailed Nov. 5, 2013, for International Patent Application No. PCT/JP2013/076539.
(Continued)

*Primary Examiner* — Dhirubhai R Patel
(74) *Attorney, Agent, or Firm* — Thomas, Karceski & Karmilovich, PC

(57) ABSTRACT

In a bus bar assembly includes a magnetic body having at least a first insertion hole and a second insertion hole and a bus bar. The bus bar is configured so that directions of electrical current flowing through it are opposed to each other at least once. The magnetic body includes a middle leg in the middle region located between portions of the bus bar. At least the middle leg defines a gap rendering a magnetic field discontinuous. The bus bar is configured to extend through the first insertion hole of the magnetic body from a first side of the magnetic body to a second side opposed to the first side with respect to an extending direction of the bus bar and further through the second insertion hole from the second side to the first side. The middle leg is located between the first and second insertion holes.

8 Claims, 14 Drawing Sheets

(56) References Cited

FOREIGN PATENT DOCUMENTS

| | | |
|---|---|---|
| JP | H07-260831 A | 10/1995 |
| JP | 2002-280764 | 7/2002 |
| WO | WO 95/29493 | 11/1995 |

OTHER PUBLICATIONS

Chinese First Notification of Reasons for Refusal dated Dec. 7, 2015, for Chinese Patent Application No. 201380005339.4.

\* cited by examiner

BUS BAR ASSEMBLY

CROSS-REFERENCE TO RELATED APPLICATION(S)

This Non-Provisional Patent Application is a National Stage Entry into the United States Patent and Trademark Office from International Patent Application No. PCT/JP2013/076539, having an international filing date of Sep. 30, 2013, and which claims priority to Japanese Patent Application No. 2012-271269, filed Dec. 12, 2012, the entire contents of both of which are incorporated herein by reference.

FIELD OF THE INVENTION

The present invention relates to a bus bar assembly which can prevent movement of a bus bar relative to a core due to vibration or the like and can efficiently reduce noise current flowing through the bus bar without magnetic saturation.

DESCRIPTION OF RELATED ART

For example, Japanese Published Patent No. 3679723 discloses a known structure of fixing a core to a bus bar of a large current type. The structure is used in hybrid vehicles, and the core corresponds to the bus bar and is provided for efficiently reducing noise current flowing into the bus bar.

In the above-described technique, a leaf spring formed of an elastic material is provided with a ceiling. Two arms extend from both ends of the ceiling into an L-shape. The arms are provided with an engagement protrusion and an extending part respectively. The core having a hollow part into which the plate-shaped bus bar is inserted is held by the ceiling and the extending part, and the engagement protrusion is engaged with a locking unit of the plate-shaped bus bar.

SUMMARY OF THE INVENTION

In the above-described structure, the core (a magnetic body) can be easily fixed and held at a predetermined position of the bus bar. On the other hand, however, the following problems arise. That is, (1) there is a possibility that vibration or oscillation of the vehicle would vary a distance between the bus bar and the core when the bus bar assembly is mounted on the vehicle. The variations would render the noise current reducing effect of the core unstable.

Further, when the variations in the distance between the bus bar and the core are tried to be suppressed, a member for fixing the core to the bus bar is rendered extensive. This complicates the mounting procedure and increases the weight of the fixing member. (2) The bus bar is configured to allow a large current to flow therethrough and the core is a complete closed circuit. Accordingly, the core shortly reaches a state of magnetic saturation by current flowing into the bus bar with the result that the noise current reduction effect is lost.

The invention was made to overcome the above-described problem and an object thereof is to provide a bus bar assembly which can prevent displacement of the magnetic body and can stably reduce noise current flowing through the bus bar.

A bus bar assembly in accordance with the invention includes a magnetic body having at least a first insertion hole and a second insertion hole and a bus bar disposed through the first and second insertion holes. In the bus bar assembly, the bus bar is configured so that directions of electrical current flowing therethrough are opposed to each other at least once. The magnetic body includes a middle leg in a middle region located between portions of the bus bar, where the directions of current are opposed to each other and end legs in end regions located opposite the middle region with respect to the portions of the bus bar. At least the middle leg defines a gap which renders a magnetic field discontinuous, the magnetic field being produced by the current flowing through the bus bar. The bus bar is configured to extend through the first insertion hole of the magnetic body from a first side of the magnetic body to a second side opposed to the first side with respect to an extending direction of the bus bar and further through the second insertion hole from the second side to the first side, the middle leg being located between the first and second insertion holes. The bus bar prevents the magnetic body from movement in any direction when the magnetic body is assembled with the bus bar.

In the bus bar assembly, the bus bar may have a substantially uniform sectional area in a part thereof disposed in the first and second insertion holes of the magnetic body.

The bus bar may include a/the part disposed in the first and second insertion holes of the magnetic body, the part being substantially formed into a C-shape or a U-shape.

The bus bar assembly may further include a spacer provided in the first and second insertion holes of the magnetic body to insulate the bus bar and the magnetic body from each other and a fastening member fixing the magnetic body to the bus bar thereby to fasten the magnetic body, the bus bar and the spacer together.

The fastening member may have an engagement portion formed to protrude from an outer periphery thereof, and the engagement portion of the fastening member may be engaged with an engagement hole provided in an external member, whereby the fastening member is mounted on the external member.

According to the bus bar assembly of the invention, the magnetic member is obstructed by the bus bar in any direction in which the magnetic body is movable thereby to be prevented from movement. Accordingly, the magnetic body is prevented from displacement relative to the bus bar in the use of the bus bar assembly in a vehicle-mounted state, with the result that the noise reduction effect of the magnetic body can be rendered stable.

Also, according to the bus bar assembly of the invention, the bus bar is configured to have a substantially uniform sectional area in a part thereof disposed in the first and second insertion holes of the magnetic body. As a result, production of noise due to the changes in the sectional area can be reduced.

Further, according to the bus bar assembly of the invention, the bus bar includes a/the part disposed in the first and second insertion holes of the magnetic body, the part being substantially formed into a C-shape or a U-shape. Accordingly, material loss can be reduced and manufacture and processing can be rendered easier, with the result that the manufacturing costs can be reduced.

Further, according to the bus bar assembly of the invention, since the magnetic body, the bus bar and the spacer are fastened together by the fastening member, the magnetic body can be prevented from displacement and the vibration resistance can be improved.

Further, according to the bus bar assembly of the invention, the fastening member is provided with the engagement portion and mounted on the external member by the engagement portion, with the result that the vibration resistance can further be improved.

BRIEF DESCRIPTION OF THE DRAWINGS

Various embodiments of the present invention will now be described in connection with the accompanying drawings, in which.

DETAILED DESCRIPTION OF EMBODIMENT(S) OF THE INVENTION

Figure 1:
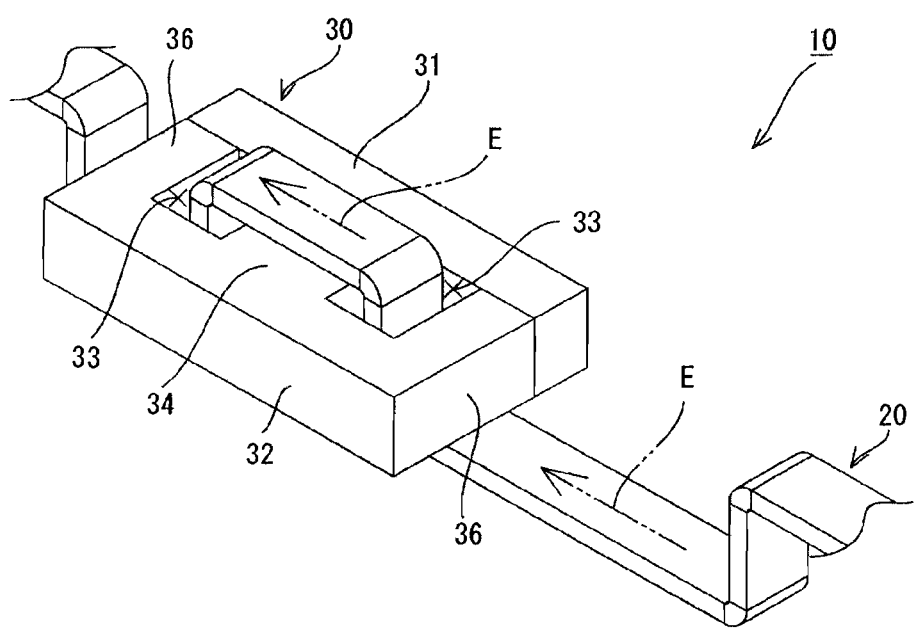
FIG. 1 is a perspective view of a bus bar assembly according to an embodiment.

Embodiments of the present invention will be described with reference to the drawings. The bus bar assembly is applied to a DC/DC converter used in a hybrid vehicle, for example.

First Embodiment

The bus bar assembly according to an embodiment is used in a power supply for a driving three-phase AC motor which is a drive source of an electric vehicle or a hybrid vehicle and a power supply for a control device of the motor. In the embodiment, however, the description of a cover member covering the whole bus bar assembly for the purpose of external separation will be eliminated. The description of the fixing member for fixing the bus bar assembly in the cover member and a capacitor and the like will also be eliminated.

In the drawings, noise current is referred to as "E" and a direction of current flow is indicated by arrows.

The bus bar assembly 10 includes at least a bus bar 20 and a core 30 serving as a magnetic body and formed by combining a first core member 31 and a second core member 32, as shown in FIG. 1. The bus bar 20 and the core 30 are assembled into the bus bar assembly 10, and the core 30 thus assembled is covered with a dedicated case made of high-temperature resin, whereby the first and second core members 31 and 32 can be prevented from being separated from each other although the case is not shown. The first and second core members 31 and 32 will be described later. The core 30 comprises ferrite in the embodiment.

The bus bar 20 is an electrically conductive member made of a conductive material such as copper and is formed into a flat plate shape. The bus bar 20 serves as an electrical current path in various devices and apparatuses in each of which the bus bar assembly 10 is used.

Figure 2:
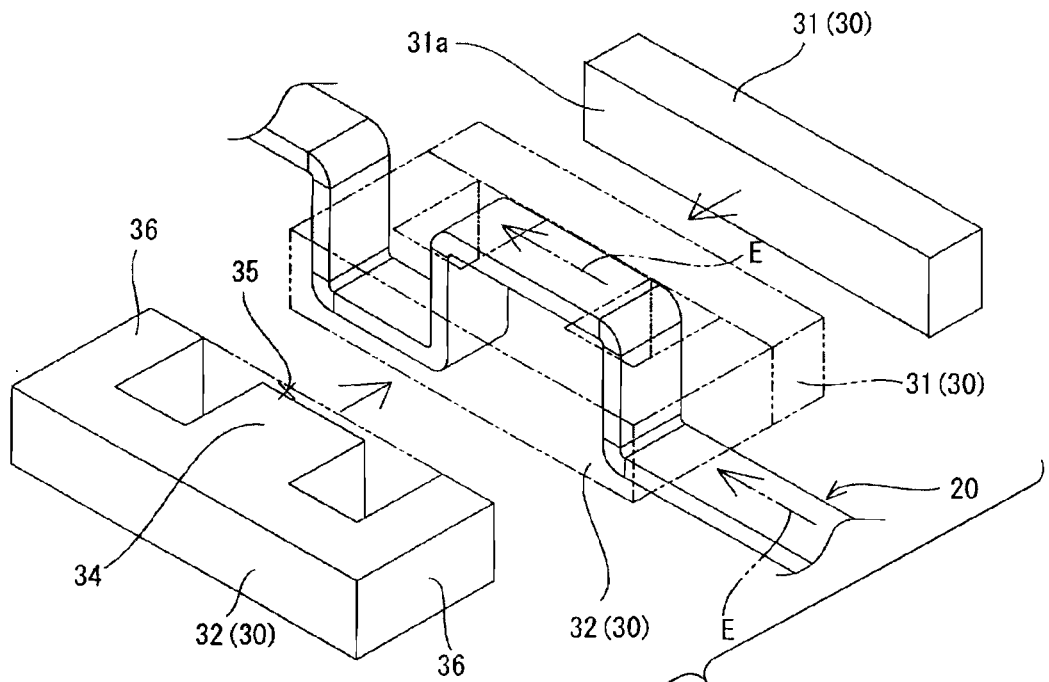
FIG. 2 is an exploded perspective view of the bus bar assembly.

The bus bar 20 is substantially formed into a C-shape with rounded corners. The bus bar 20 is inserted through one (a right lower hole as in FIG. 1) of insertion holes 33 upward from the underside of the core 30 and is further inserted through the other insertion hole 33 (a left upper hole as in FIG. 1) downward from the top of the core 30, as shown in FIGS. 1 and 2.

The bus bar 20 has a section perpendicular to a direction in which current E flows through the bus bar. The section has an area that is set to be substantially uniform at least in a range in which the noise current reduction of the core 30 is effective (by rounding the corners, or the like).

When the corners are not rounded, a sectional area of each corner through which the current E can flow is increased toward each corner and is subsequently reduced. The increase and reduction in the sectional area change a resistance value (of the bus bar 20). Since the change in the resistance value changes the easiness in the flow of noise current through the bus bar 20, the noise current produces radiation noise at the changed part or is reflected thereby to flow counter to the current E through the bus bar 20, producing new noise.

However, the bus bar assembly 10 of the embodiment in which the corners are rounded can prevent the above-mentioned problem.

Figure 3:
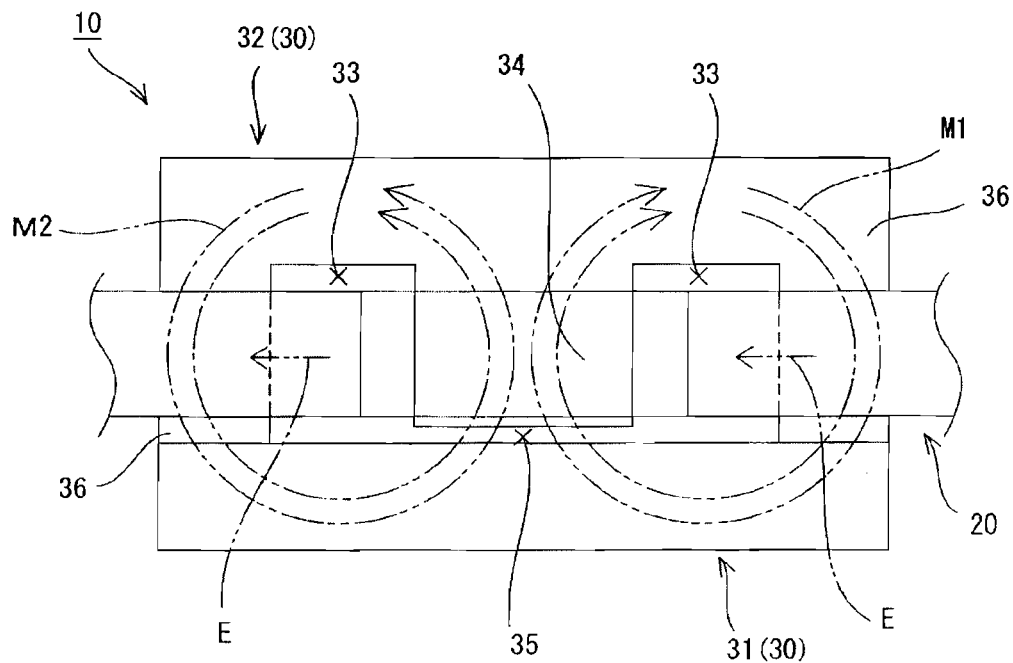
FIG. 3 is a schematic diagrammatic view of a core and vicinity thereof in the bus bar assembly according to the embodiment, showing a gap.
Figure 4:
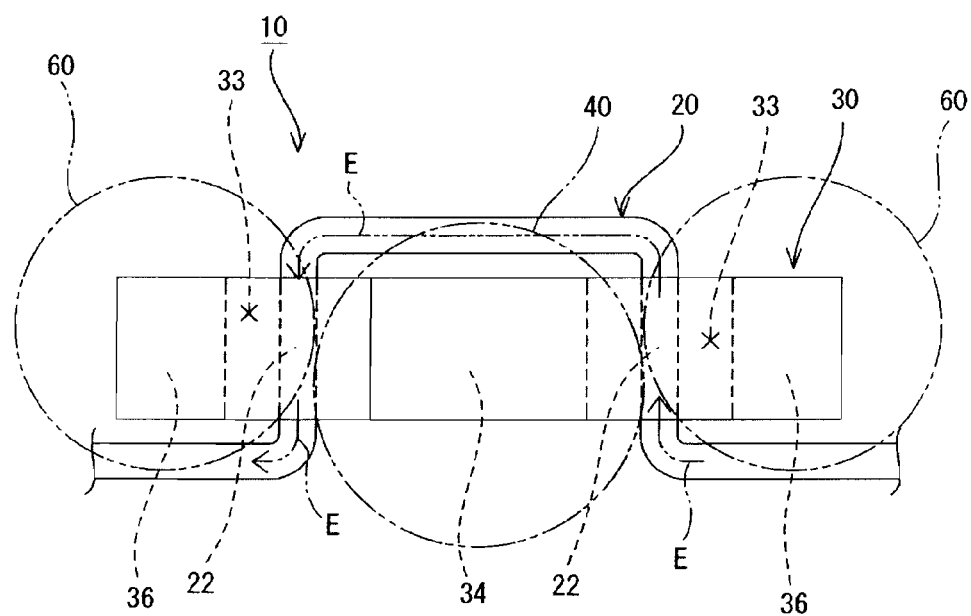
FIG. 4 is a schematic diagrammatic view of the core and the vicinity thereof according to the embodiment, showing a direction of current flowing through the bus bar.

The directions of current E flowing in both ends 22 of the substantially C-shaped part of the bus bar 20 are opposed to each other, as shown in FIG. 3. A region between the parts 22 in which the directions of current E are opposed to each other is referred to as "a middle region 40" in the description. Regions located opposite the middle region 40 relative to the parts 22 are referred to as "end regions 60" respectively.

The core 30 is generally formed into a 0-shape and includes a generally I-shaped first core member 31 and a generally E-shaped second core member 32, as shown in FIGS. 1 and 2. The second core member 32 is formed with a centrally located middle leg 34 and two end legs 36 at both ends thereof respectively.

The bus bar 20 is configured to be inserted through the insertion holes 33. As the result of the above-described construction, the core 30 functions as a noise remover which reduces noise current flowing into the bus bar 20.

The first and second core members 31 and 32 are combined with each other so as to hold the bus bar 20 therebetween as shown in FIG. 2 (see alternate long and two short dashes line in FIG. 2). In this case, the first core member 31 is combined while being located at one of both sides of the bus bar 20 (at the right upper side as viewed in FIG. 2), and the second core member 32 is combined while the recesses thereof are located at the other side of the bus bar 20 (at the left lower side as viewed in FIG. 2).

By combining the core members 31 and 32 as described above, the core 30 enclosing the bus bar 20 is constructed, and two insertion holes 33 through which the bus bar 20 extends are defined.

When the core members 31 and 32 have been combined with each other, distal end surfaces of the end legs 36 closely contact with a flat surface 31a of the first core member 31 located at the second core member 32 side with the result that the core members 31 and 32 are magnetically integrated. The middle leg 34 has a length that is set to be shorter than those of the end legs 36. Accordingly, when the core members 31 and 32 are combined with each other, the distal end surface of the middle leg 34 is spaced from the surface 31a such that a gap 35 is defined therebetween.

When the bus bar 20 and the core 30 are thus integrated, the bus bar assembly 10 is structured so that the middle leg 34 of the core 30 is located in a middle region 40 and so that the end legs 36 are located in end regions 60 respectively. More specifically, the middle leg 34 with the gap 35 is located between the portions 22 where the directions of current E flowing through the bus bar 20 are opposed to each other.

An insulating resin or a spacer made of the insulating resin is interposed between the bus bar 20 and the core 30 so that the current flowing through the bus bar 20 can be prevented from leaking outside via the core 30. As a result, the bus bar 20 and the core 30 can be tightly integrated and prevented from being displaced relative to each other, whereupon further reliable insulation properties can be ensured.

The bus bar assembly thus constructed will work as follows. When current E is caused to flow into the bus bar 20 (see FIGS. 1 to 4), a magnetic field is produced with flow of current E. Magnetic field lines represent the strength and direction of the magnetic field by means of arrows. Reference symbol "M" indicates the magnetic field lines in the following description.

Current E flows from the front side to the inner side in the right insertion hole 33 and from the inner side to the front side in the left insertion hole 33, as viewed in FIG. 3. When current E flows in this manner, clockwise magnetic fields (magnetic field lines M1) are produced in the right insertion hole 33 and counterclockwise magnetic fields (magnetic field lines M2) are produced in the left insertion hole 33, as viewed in FIG. 3.

As current E flowing into the bus bar 20 becomes large, magnetic saturation occurs more easily over a magnetization capacity of the core 30 (saturation magnetic flux density). When magnetic saturation occurs in the core 30, the effect of reducing the noise current flowing through the bus bar 20 is lost.

However, the middle leg 34 with the gap 35 is provided in the middle region 40 in the core 30 of the bus bar assembly 10 according to the embodiment. Consequently, the gap 35, that is, air with a lower magnetic permeability serve as magnetic resistance, which reduces the magnetic field (magnetic lines M1, M2) to be taken into the core 30, whereupon the magnetic field can be prevented from exceeding the capacity of the core 30.

Further, since the middle leg 34 of the middle region 40 where both magnetic force lines M1 and M2 are present is provided with the gap 35, noise current of the magnetic force lines M1 and M2 can be coped with and the end legs 36 directly contact with the first core member 31 (without inclusion). Consequently, since the assembly of the core 30 and the fixation to the bus bar 20 are rendered more stable, the core 30 can be prevented from backlash and/or displacement, the first and second core members 31 and 32 can be prevented from being separated from each other or from being broken.

Further, the surfaces of the end legs 36 and the surface 31a of the first core member 31 are flat and are accordingly configured to contact with each other without backlash, the aforementioned effects can be further improved.

Further, as understood from FIGS. 1 to 4, when the core 30 is to be moved up and down, back and forth and/or right and left, the core 30 can be prevented from movement in any direction since any one of sides of the bus bar 20 is opposed to the core 30. More specifically, the core 30 is prevented from movement in any direction when the bus bar assembly 10 according to the embodiment is used with equipment mounted on a vehicle or the like. This can prevent occurrence of any problem resulting from displacement of the core 30 due to vibration or the like.

The directions of current E flowing through the bus bar 20 are opposed to each other so as to differ by 180° in the embodiment. However, the angle should not be limited to 180°.

Figure 5:
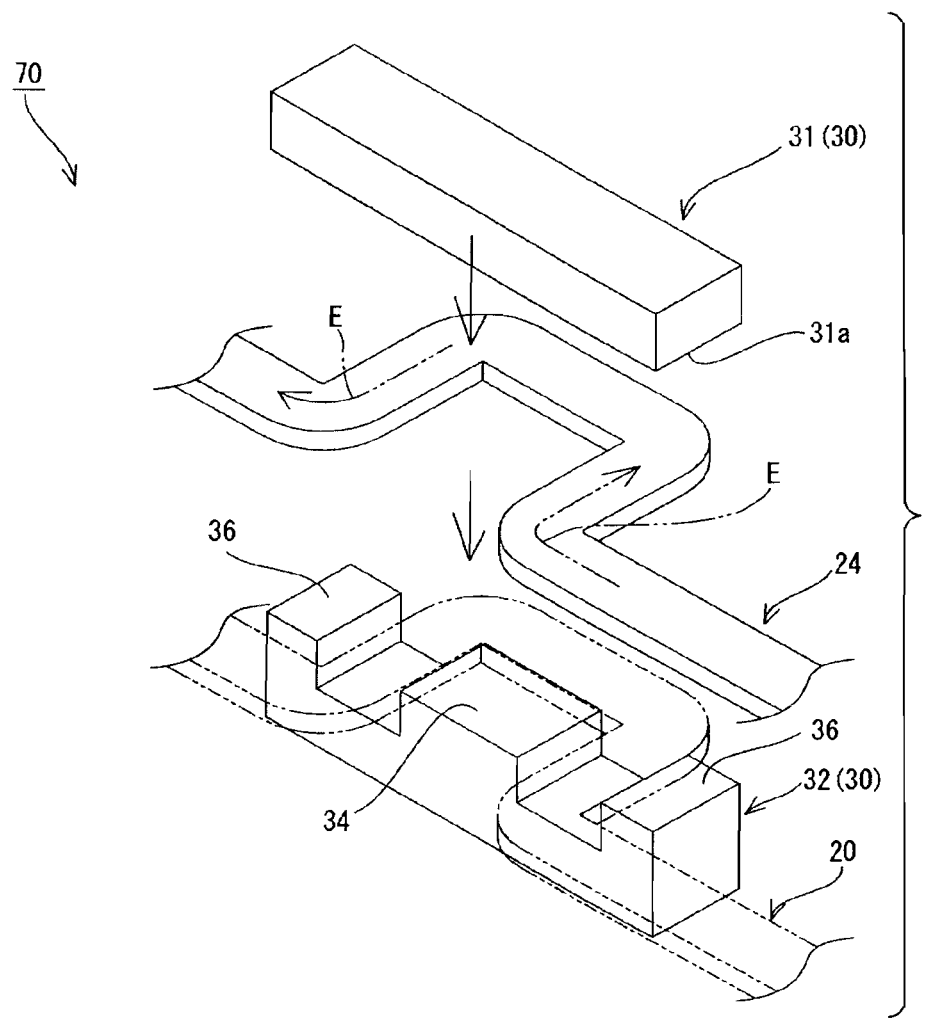
FIG. 5 is an exploded perspective view of the bus bar assembly according to another embodiment.
Figure 6:
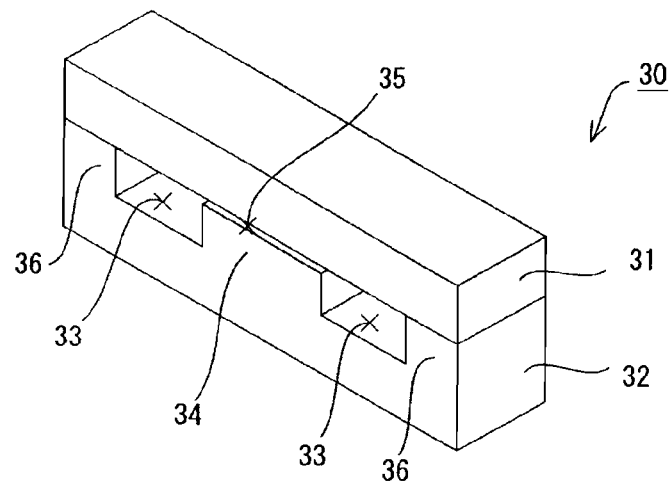
FIG. 6 is a perspective view of the core of the bus bar assembly shown in FIG. 5.

The bus bar assembly 70 may include a bus bar 24 punched out of a single flat plate as shown in FIGS. 5 and 6. In this case, time and costs required for manufacture of the bus bar assembly 70 can be reduced since the bus bar assembly 70 can be manufactured only by punching it out of the flat plate. Further, the bus bar 24 has rounded corners in the same manner as in the foregoing embodiment. This can reduce noise radiated from the corners.

In this embodiment, too, the middle leg 34 with the gap 35 is located between the portions 22 of the bus bar 24, in which portions the directions of current E are opposed to each other. More specifically, since the gap 35, in other words, air which is present in the gap 35 and has a low permeability serves as magnetic resistance, the magnetization capacity of the core 30 (saturation magnetic flux density) can be prevented from being exceeded, the core 30 continues to exert a current reduction effect without losing the effect.

Figure 7A:
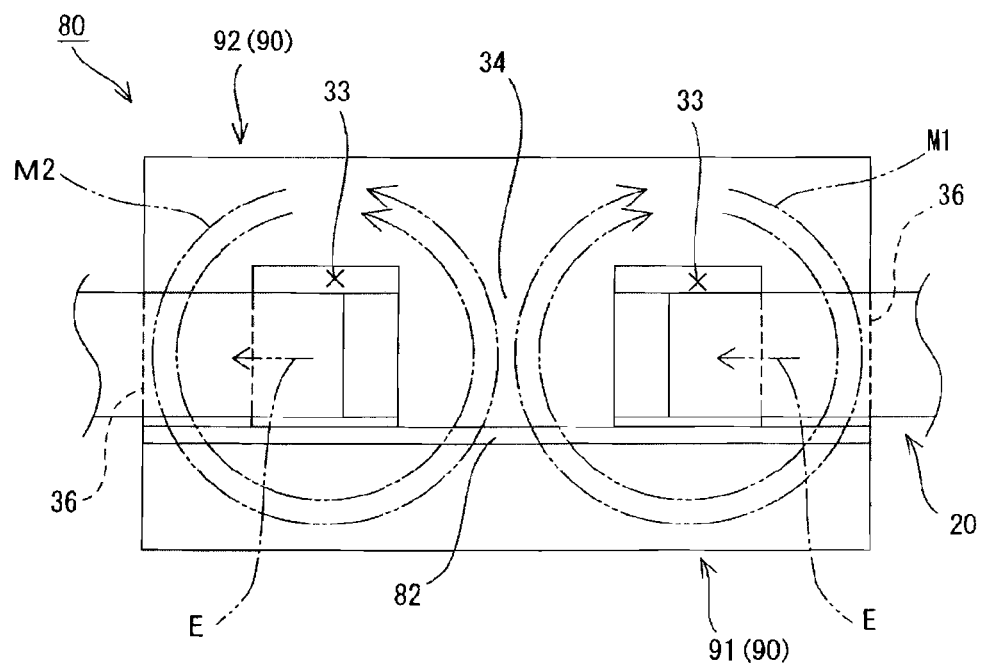
FIGS. 7A and 7B are schematic diagrammatic views of the bus bar assembly according to a modified form.

Although the core 30 comprises the substantially I-shaped first core member 31 and the substantially E-shaped second core member 32 in each of the foregoing embodiments, the invention should not be limited to the embodiments. For example, as a bus bar assembly 80 shown in FIG. 7A, the middle leg 34 has the same height (length) as the end legs 36, and an insulating member 82 such as PET resin may be interposed between the substantially I-shaped first core member 91 and the substantially E-shaped second core member 92. In this case, since the gaps 35 in the foregoing embodiments are defined in the end legs 36 as well as in the middle leg 34, each one of the lines of magnetic force M1 and M2 serves as magnetic resistance at two portions where the insulating member 82 is located, with the result that the magnetization capacity of the core 30 (saturation magnetic flux density) can be prevented from being exceeded. It is desirable that the material of the insulating member 82 should be made of a material with low permeability.

Figure 7B:
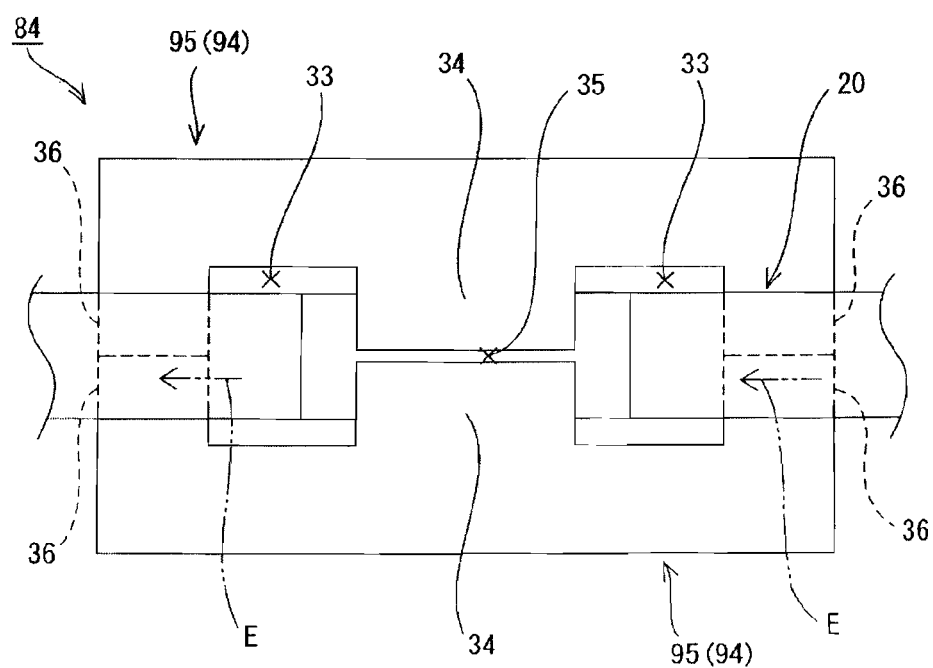

Further, the core 94 may comprise two core members 95 which are generally formed into the substantially same E-shape, as shown in FIG. 7B. In this case, both core members 95 have respective middle legs 34 and respective end legs 36. The gap 35 is defined between the middle legs 34.

Furthermore, the sectional shape of the bus bar and the shape of the insertion holes may be optionally selected or set. For example, the section of the bus bar may have a circular, square or another shape.

Figure 8A:
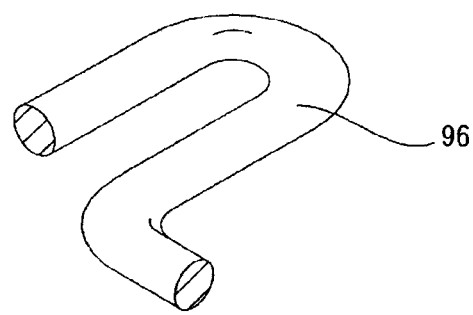
FIGS. 8A and 8B are perspective views of a bus bar and a bus bar assembly according to another modified form respectively.

In particular, the sectional area does not change in bent portions when the bus bar 96 has a substantially circular sectional shape as shown in FIG. 8A, and the bus bar 96 is prevented from deformation, such as corrugation, resulting from the bending process. Accordingly, since the resistance value of the bus bar 96 is prevented from changing, radiation noise resulting from noise current can be prevented, and reflection of noise current can be prevented from reversing the flow of current E along the bus bar 96 thereby to produce further noise (see paragraph 0017).

Further, when the bus bar 96 has a generally circular sectional shape, the bus bar 96 can be bent in any direction.

Further, the bus bar assembly may comprise generally 3-shaped core members 97 formed into the cores 98 by connecting a plurality of magnetic bodies which have sectional shapes according to generally circular bus bar 96 and each of which has an approximately cylindrical shape. In this case, the cores 98 have respective insertion holes 33. Each 3-shaped core member 97 has convex portions of both ends serving as end legs 97*b* and a central convex portion serving as a middle leg 97*a*. A gap 99 is defined between the middle legs 97*a* of the central convex portions of the core members 97 respectively.

In the above-described case, magnetic fields produced from noise current flowing through the bus bar 96 can be introduced into the cores 98 most efficiently. As a result, noise current flowing through the bus bar 96 can be reduced most efficiently. The reason for this is that magnetic fields are produced in the shape of a circle about the bus bar 96 (see magnetic lines of force M1 and M2 in FIGS. 3 and 7).

Figure 9:
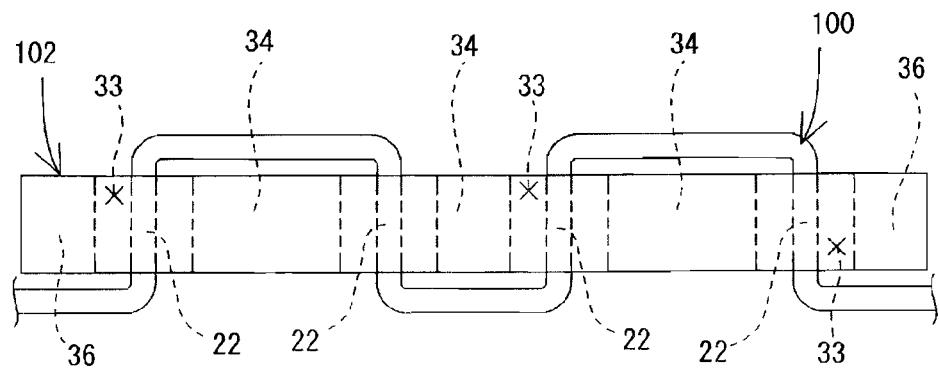
FIG. 9 is a schematic diagrammatic view of a bus bar assembly according to further another modified form.

Further, as shown in FIG. 9, the number of bent portions in the bus bar 100 may be increased so that the bus bar 100 is inserted through a plurality of insertion holes 33 (three in FIG. 9) defined in the core 102. In this structure, the directions of current E flowing in the core 102 are opposed to each other at a plurality of portions 22 (four in FIG. 9).

The core 102 has both ends which are formed with end legs 36 respectively, and a plurality of middle legs 34 (three in FIG. 9) is formed between the portions 22. In this case, the effect of reducing noise current is further increased since the path extending through the core 102, through which the bus bar 100 is inserted, is increased. Further, when the core 102 is to be moved up and down, back and forth and/or right and left, the number (frequency) of portions of the bus bar 100 opposed to each other is increased. This can render the prevention of the movement of the bus bar further effective.

The dedicated case (see paragraph 0015) covering the core externally covering the core may be electrically conductive, for example. An effect of preventing (electromagnetic) noise from externally going into the bus bar and other effects can be expected in this case.

The dedicated case may be made of a material, such as elastomer, having functions of vibration control, vibration absorption, thermal conduction, thermal absorption and the like.

For example, when the bus bar assembly has an additional function of vibration control, members of the assembly can be prevented from dropout due to vibration, or the like during drive of a vehicle in which the bus bar assembly is used.

Further, when the bus bar assembly has an additional function of thermal conduction, heat accumulated in the core 30 is discharged more effectively by the use of the bus bar assembly, with the result that the function of the core can be stabilized for a long time.

A second embodiment of the invention will now be described with reference to FIGS. 10 to 14. In the second embodiment, the identical or similar parts are labeled by the same reference symbols as those in the first embodiment, and the detailed description of these parts will be eliminated.

When used, for example, in vehicles, a bus bar assembly is sometimes disposed at a position near a vibration source for the reason of size reduction or space saving or for the reason that wiring length is shortened for suppression of influences of external noise or for other reasons. An engine of the vehicle (a drive motor in an electric vehicle and a hybrid vehicle) is considered as the above-mentioned vibration source. When the bus bar assembly is thus disposed near the vibration source, large vibration is applied to the bus bar assembly. Further, the bus bar assembly has only to have resistance to up-and-down vibration when disposed at a position away from the vibration source in the vehicle. However, there is a possibility that the bus bar assembly with the resistance to unidirectional vibration cannot cope with the case where the bus bar assembly is disposed near the vibration source or mounted directly on the vibration source.

In this case, the vibration resistance is considered to be improved by firmly mounting the core (the magnetic body). However, since the core is formed by sintering a magnetic material or by another manner, the core has the potential to be broken when firmly fixed by a metal spring member or the like as in the prior art. Further, a fixing member for fixing the core is considered to be provided. However, the core formed by sintering the magnetic body material has sometimes dimensional differences. Accordingly, the core has the possibility of being unsuccessfully fixed due to the dimensional differences thereof even though the fixing member is manufactured with predetermined accuracy.

In view of the foregoing problem, a positional displacement of the core can be prevented while the vibration resistance is improved with prevention of damage to the core in the invention, as will be described later.

Figure 10:
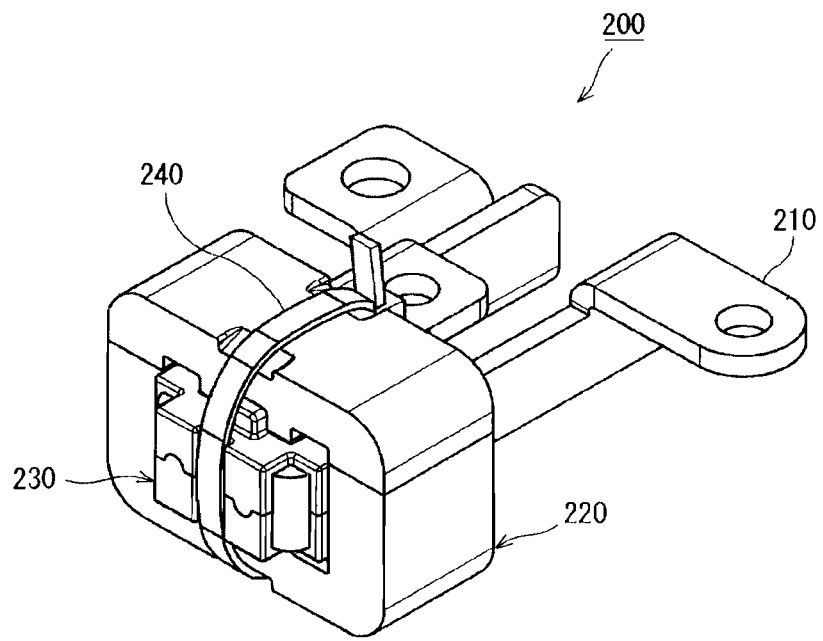
FIG. 10 is a schematic diagrammatic view of the bus bar assembly according to a second embodiment.

The bus bar assembly 200 according to the second embodiment includes the bus bar 210, the core 220 as the magnetic body and a fastening member 240, as shown in FIG. 10. The bus bar 210 is an electrically conductive member made of a conductive material such as copper and is formed into a flat plate shape as in the first embodiment. The bus bar 210 serves as an electrical current path in various devices and apparatuses in each of which the bus bar assembly 200 is used. The shape of the bus bar 210 shown in FIG. 10 is merely an example and should not be limited to that shown in FIG. 10 and the like.

Figure 11:
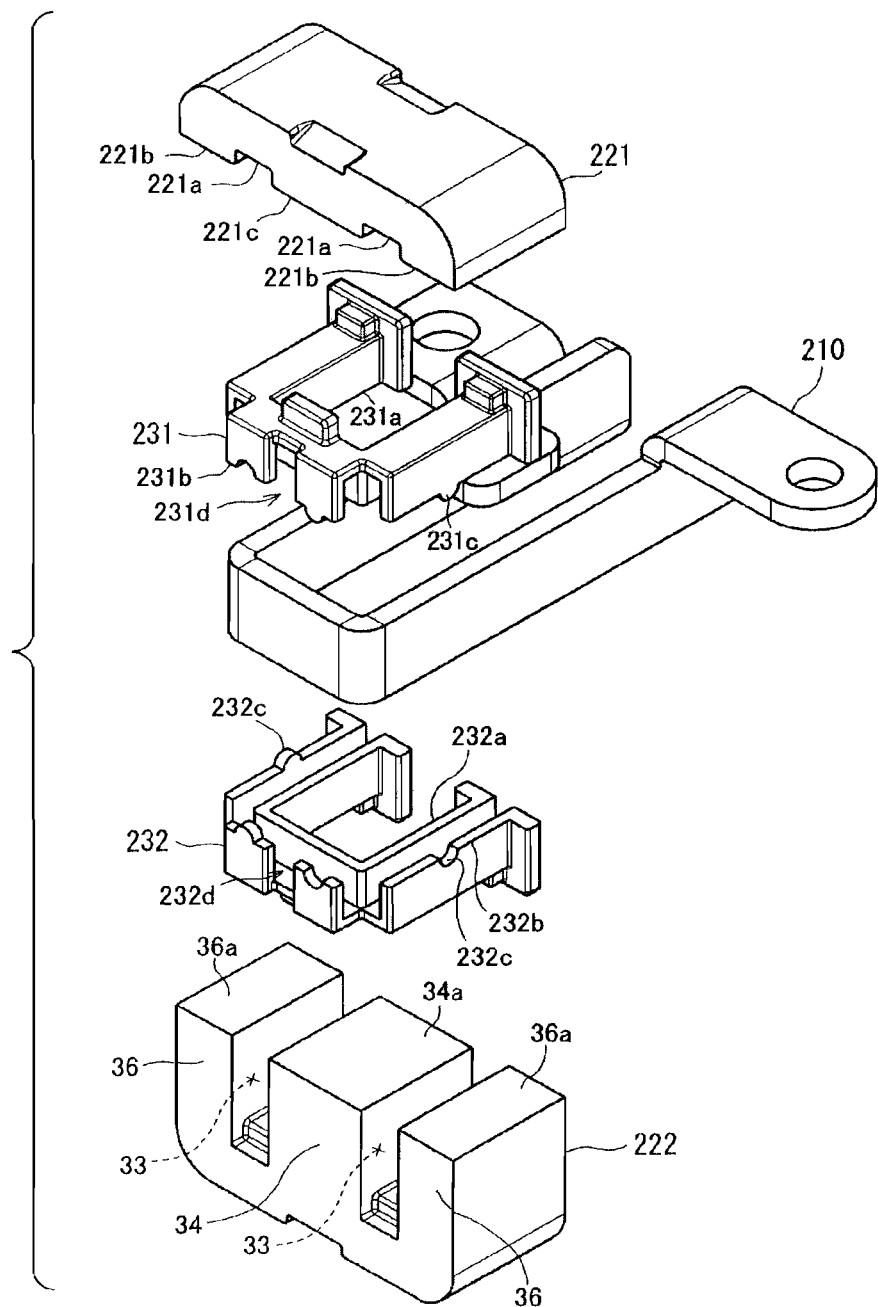
FIG. 11 is an exploded view of the bus bar assembly (No. 1)

The core 220 has the first core member 221 and the second core member 222 as shown in FIG. 11. The first core member 221 is generally formed into an I-shape and the second core member 222 is generally formed into an E-shape. The first core member 221 has a side which is located at the second core member 222 side and is provided with a groove 221*a*. The second core member 222 has a middle part provided with a middle leg 34 and both ends provided with two end legs 36 respectively. The first and second core members are combined with each other into a generally θ-shaped core 220 formed with two through holes 33 in the same manner as in the foregoing embodiment. The bus bar 220 is inserted through the holes 33, and each hole 33 has a function of positioning the spacer 230.

When the first and second core members 221 and 222 are combined together, distal end faces 36*a* of the end legs 36 closely contacts with a flat surface 221*b* at the first core member 221 side without any gap to be magnetically incorporated. On the other hand, the middle leg 34 has a length set to be shorter than those of the end legs 36 and includes a distal end face 34*a* spaced away from the surface 221*c* near the middle of the first core member 221, whereby a gap is defined between the distal end face 34*a* and the surface 221*c*. The gap, that is, an air layer with a lower magnetic permeability serve as magnetic resistance, which reduces the magnetic field to be taken into the core 220. Consequently, since the magnetic saturation of the core 220 is suppressed, a noise component eliminating efficiency can be improved.

The spacer 230 includes a first member 231 and a second member 232. The spacer 230 is formed of a resin material having heat resistance and an insulating property, for example. The first member 231 has an inner wall 231*a* located at the inner peripheral side relative to the bus bar 210 and an outer wall 231*b* located at the outer peripheral side relative to the bus bar 210 when disposed in the holes 33. Further, the second member 232 has an inner wall 232*a* located at the inner peripheral side relative to the bus bar 210 and an outer wall 232b located at the outer peripheral side relative to the bus bar 210.

Accordingly, a groove through which the bus bar 232a extends is defined between the inner walls 231a and 232a and the outer walls 231b and 232b. As a result, when the spacer 230 is disposed in the hole 33, the inner walls 231a and 232a are located between the bus bar 210 and the middle legs 34. The outer walls 231b and 232b are located between the bus bar 210 and end legs 36.

The spacer 230 thus constructed insulates between the bus bar 210 and the core 200 and positions the bus bar 210 in the hole 33. The first and second members 231 and 232 are positioned by concavo-convex portions 231c provided on the outer wall 231b and concavo-convex portions 232c provided on the end surface side of the outer peripheral wall 232b.

Figure 12:
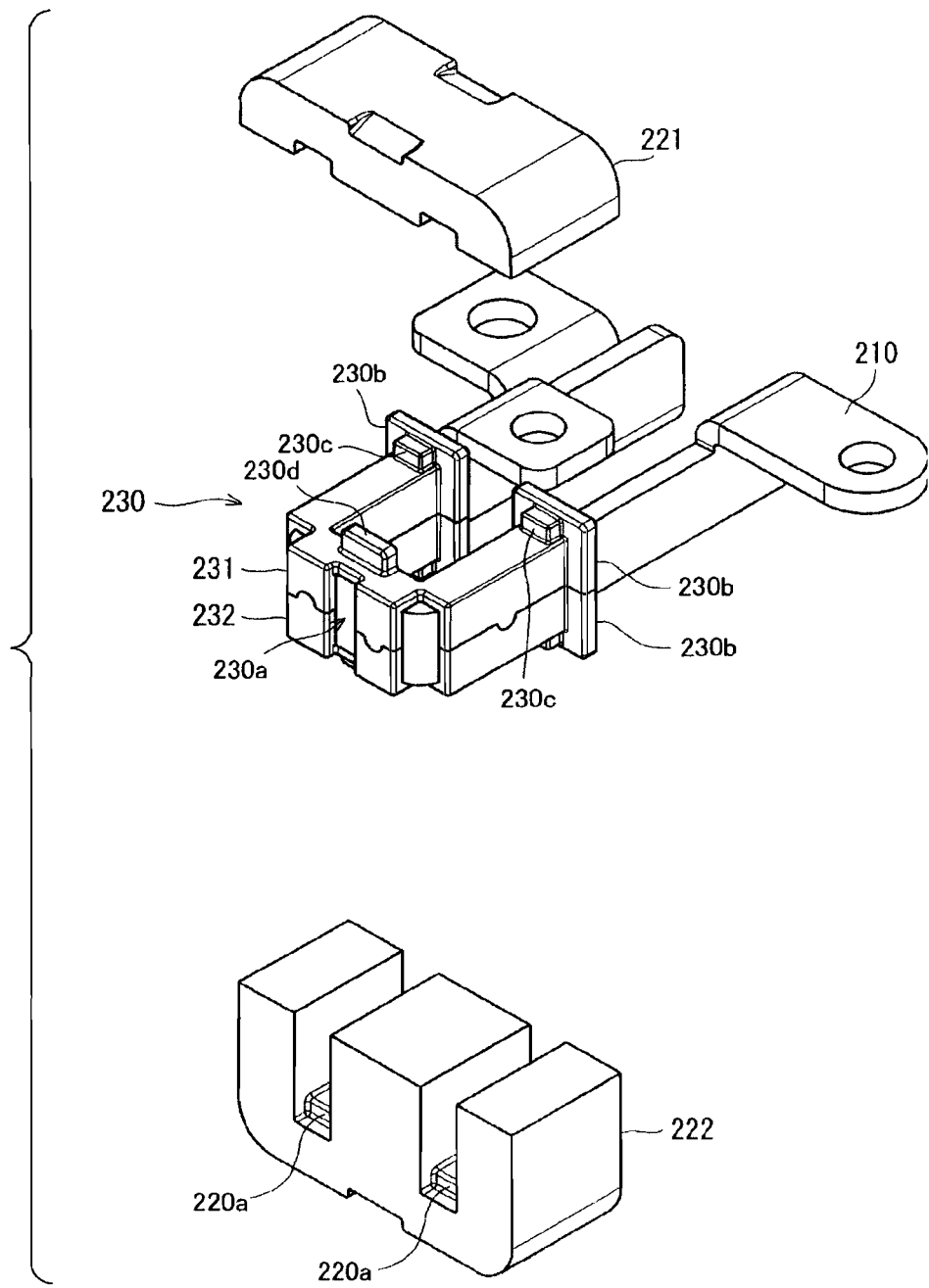
FIG. 12 is an exploded view of the bus bar assembly (No. 2)
Figure 13:
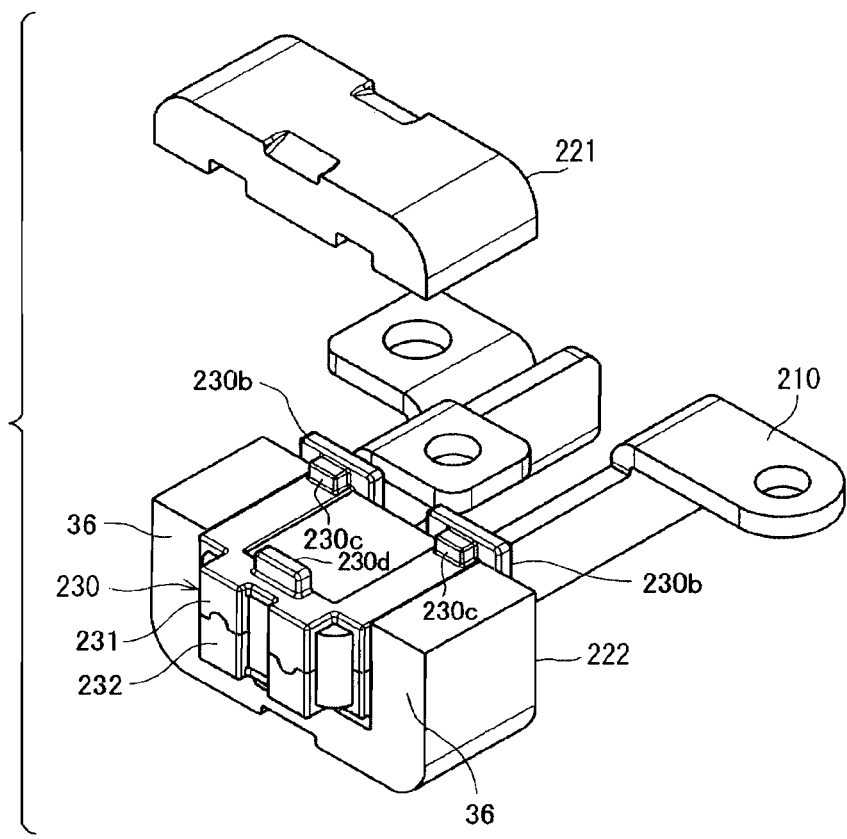
FIG. 13 is an exploded view of the bus bar assembly (No. 3)

The outer walls 231b and 232b of the first and second members 231 and 232 have middle portions provided with discontinuous portions 231d and 232d respectively. The discontinuous portions 231d and 232d define an exposed region 230a where the outer periphery of the bus bar 210 is exposed, as shown in FIG. 12.

The spacer 230 is formed so that the second member 232 is lower in height than the middle leg 34 and so that a total height of the combination of the first and second members 231 and 232 is greater than those of the end legs 36. The spacer 230 is configured so that a higher part of the spacer 230 than the end legs 36 is inserted into the groove 221a of the first core member 221. More specifically, the spacer 230 is formed to be slightly smaller than an inner circumference of the hole 33 so that the spacer 230 is insertable into the hole 33.

Figure 14:
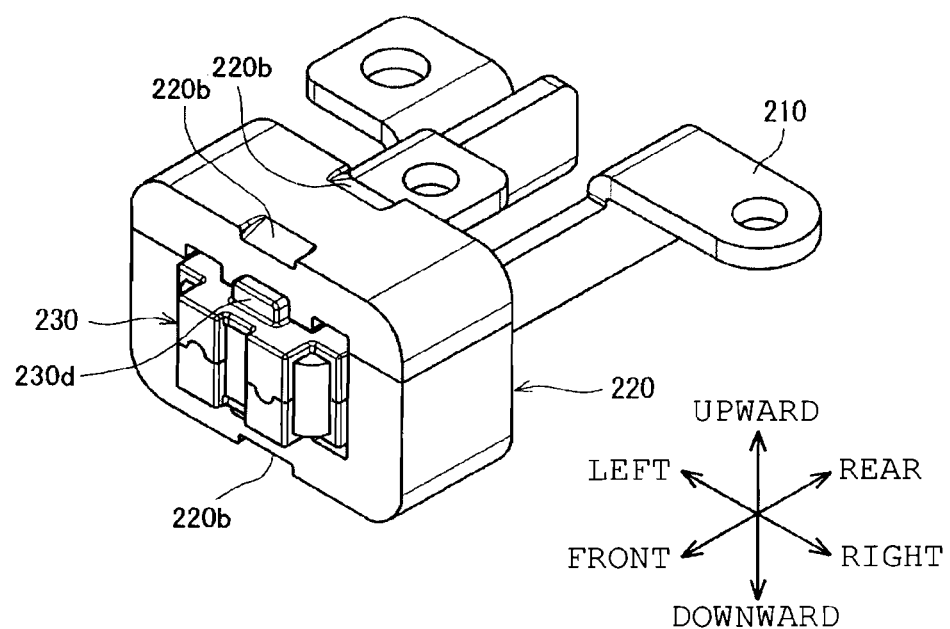
FIG. 14 is an exploded view of the bus bar assembly (No. 4)

The first member 231 of the spacer 230 is provided with flanges 230b, smaller ribs 230c and a larger rib 230d. The second member 232 also has smaller ribs 230c and a larger rib 230d all of which are arranged in the same manner as in the first member 230c. Each flange 230b has an outline larger than the inner circumference of the hole 33 and contacts with an end face of the core 220. The smaller ribs 230c are formed so as to correspond to stepped portions 220a (see FIG. 12) in position and shape. The stepped portions 220a are provided in portions of the first and second core members 221 and 222, in which portions the holes 33 are to be formed, respectively. The larger ribs 230d are brought into contact with end faces of the core 220 located opposite the flanges 230b respectively as shown in FIG. 14.

As the result of the foregoing construction, the spacer 230 is prevented from movement in the penetrating direction of the holes 33 (hereinafter, "front-rear direction" for descriptive purposes) when disposed in the holes 33. Further, the spacer 230 is prevented from movement toward both end legs 36 (hereinafter, "right-left direction" for descriptive purposes). As the first and second core members 221 and 222 are combined with each other, the spacer 230 is prevented from movement toward the first and second core members 221 and 222 (hereinafter, "up-down direction" for descriptive purposes).

Further, the space 230 formed so as to be slightly smaller than the holes 33 is disposed in the holes 33. Accordingly, even if the spacer 230 is displaced such that the first and second members 231 and 232 depart from each other, the displacement is prevented from becoming larger than the concavo-convex portions 231c and the concavo-convex portions 232c. This prevents the first and second members 231 and 232 from being displaced in the front-rear direction.

The bus bar 210, the core 220 and the spacer 230 thus assembled are fastened by a fastening member 240 as shown in FIG. 10. The fastening member 240 is formed of, for example, a resin material having at least flexibility and heat resistance, such as a clamping band. The core 220 has guide grooves 220b which are formed at front-back end face sides and are inclined slightly from the upper surface, as shown in FIG. 14. The guide grooves 220b are provided in the first and second core members 221 and 222 respectively. The fastening member 240 fastens the bus bar 210, the core 220 and the spacer 230 integrally along the guide grooves 220b. Since the guide grooves 220b are formed so as to recess from the surface of the core 220 into a concave shape, the clamping member 240 is prevented from displacement in the right-left direction.

The fastening member 240 directly contacts with the core 220 on upper and lower sides of the core 220. The fastening member 240 further directly contacts with the core 220 between the flanges 230b on the rear side of the core 220. On the other hand, since the above-mentioned exposed region 230a is provided on the front of the core 220, the fastening member 240 directly contacts with the bus bar 210. In other words, the fastening member 240 tightly fastening the bus bar 210 and the core 220. When the bus bar 210 and the core 220 are thus tightly fastened, the inner walls 231a and 232a of the spacer 230 and the larger ribs 230d are fixed between the bus bar 210 and the core 220. More specifically, the fastening member 240 fastens the bus bar 210 and the core 220 thereby to fix the bus bar 210, the core 220 and the spacer 230 integrally and strongly.

According to the second embodiment described above, the following effects can be achieved in addition to the effects described in the first or other embodiments.

In the bus bar assembly 200, the bus bar 210 and the core 220 are fastened by the fastening member 240, so that the core 220 and the spacer 230 are fixed integrally to each other. Accordingly, a conventionally used metal spring member or the like need not be provided in order to fix the core 220. This can reduce the possibility of damage of the core 220.

In this case, since the discontinuous portions 231d and 232d are provided so that the fastening member 240 directly contacts with the bus bar 210, the bus bar 210 and the core 220 and the spacer 230 can be fixed integrally while the spacer 230 is provided, in other words, while insulation is ensured between the bus bar 210 and the core 220.

The vibration resistance can be improved since the bus bar 210, the core 220 and the spacer 230 are fixed by the fastening member 240 integrally and strongly.

The relative positional relationship between the bus bar 210 and the core 220 is fixed since the core 220 is fixed to the bus bar 210 in the bus bar assembly 200. Accordingly, even when multidirectional vibration is applied to the bus bar assembly 200, the positional relationship between the bus bar 210 and the core 220 can be prevented from shifting. This can improve the resistance to multidirectional vibration, and the bus bar assembly can cope with the case where it is mounted at a position near a vibration source or directly on the vibration source.

Further, since the core 220 is fixed to the bus bar 210, the vibration transferred to the core 220 is limited to that transferred via the bus bar 210. As a result, since vibration is prevented from being applied to the core 220 from different directions, the vibration resistance can be further improved.

Since the core 220 is provided with the guide grooves 220d, the fastening member 240 can be prevented from displacement in the right-left direction. Since the fastening member 240 is thus prevented from displacement, the bus bar 210, the core 220 and the spacer 230 fastened by the fastening member 240 can also be prevented from positional displacement.

Modified forms of the second embodiment will be described with reference to FIGS. 15 and 16. The construction except for the fastening member is common to the second embodiment and the modified forms, detailed description of the common construction will be eliminated.

Figure 15:
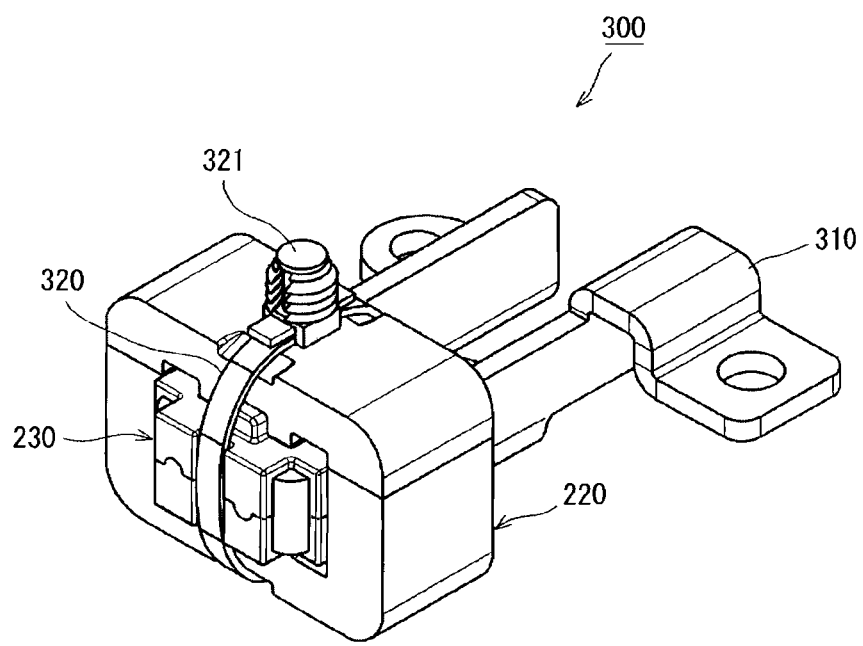
FIG. 15 is a schematic diagrammatic view of the bus bar assembly according to a modified form of the second embodiment.

The fastening member 320 provided on the bus bar assembly 300 in the modified form is provided with an engagement portion 321 as shown in FIG. 15. The fastening member 320 is formed of a resin material having flexibility and heat resistance in the same manner as the fastening member 240 in the second embodiment. Accordingly, the engagement portion 321 has elasticity. It is more desirable that the fastening member 320 and the engagement portion 321 should be formed of a material with damping characteristics of damping expected vibration. The engagement portion 321 is formed into a cylindrical shape and protrudes from the peripheral surface of the fastening member 320 located at the side opposed to the core 220. The engagement portion 321 has a peripheral surface provided with a plurality of creases extending radially outward. The engagement portion 321 is formed of the same material as of the fastening member 320. The bus bar 310 is substantially similar to the bus bar 210 described in the second embodiment although the bus bar 310 has a shape differing from that of bus bar 210.

Figure 16:
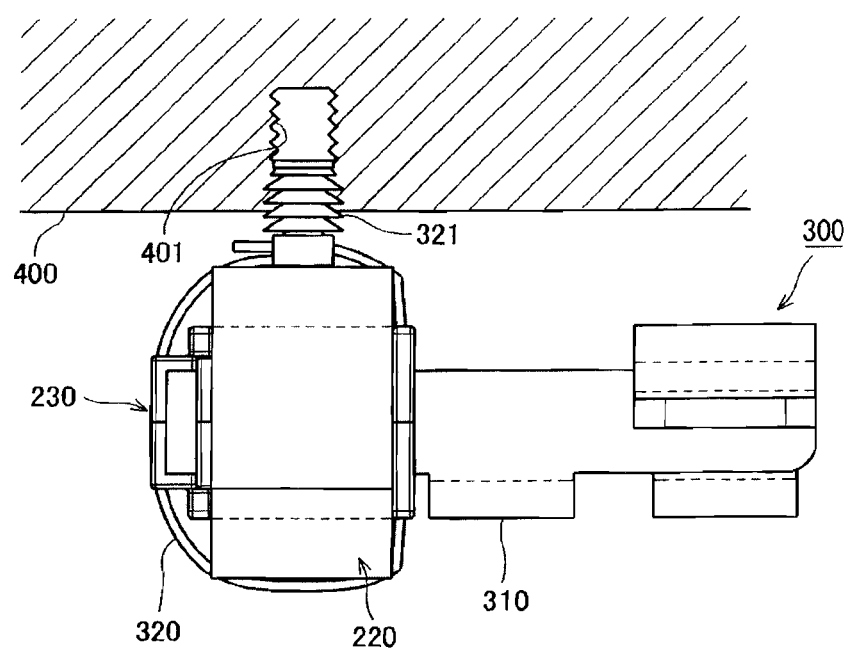
FIG. 16 is a schematic diagrammatic view showing a manner of mounting onto an external member.

The engagement portion 321 engages an engagement hole 401 provided in an external member 400, as shown in FIG. 16. The engagement hole 401 has an inner circumference formed with a plurality of convex portions engageable with the creases of the engagement portion 321. A tapped hole may be employed as the engagement hole 401. A hole having a flat inner circumference with no ruggedness may be employed since the engagement portion 321 is creased.

The fastening member 320 is mounted to the external member 400 by inserting the engagement portion 321 into the engagement hole 401. In this case, since the engagement portion 321 has the elasticity, vibration is absorbed by the engagement portion 321 to some extent even when the external member 400 vibrates.

Since the bus bar assembly 300 is mounted by the engagement portion 321 to the external member 400, the entire bus bar assembly 300 can be prevented from being vibrated even when large vibration is applied to the external member 400. Consequently, the mounting portion of the bus bar 310 can be prevented from damage or the like due to metal fatigue or the like caused, for example, by continuation of large vibration.

The position of engagement portion 321 is an example and may be directed according to an installed state of the bus bar assembly 300, for example, may protrude frontward or downward.

The invention should not be limited to the foregoing embodiments but may be modified or expanded as follows, and the constructions exemplified in the embodiments may be combined optionally.

Figure 8B:
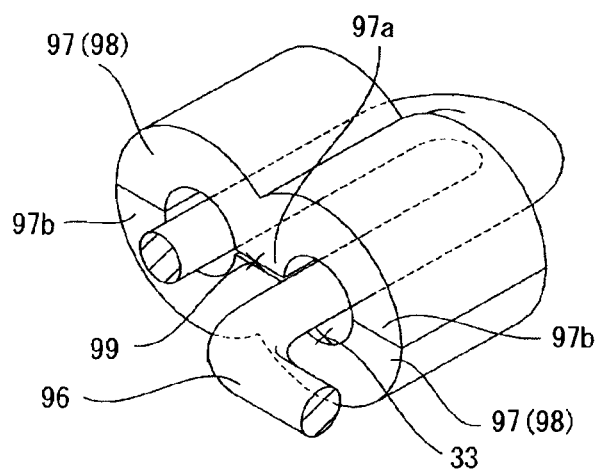

The fastening member shown in the second embodiment may be applied to the core 98 with a shape obtained by connecting a plurality of core members whose shapes approximate a cylindrical shape as shown in FIG. 8.

Although the guide grooves 220b are formed in front and rear of the core 220 in the second embodiment, a guide groove may extend from the front to the rear of the core 220. Further, when the continuous guide groove is provided, the depth of the groove should be set so that the fastening member is prevented from protruding from the surface of the core 220. As a result, the surface of the core 220 is rendered flat with the result that the core 220 can be caused to tightly contact with the radiating member, the external member and the like. In other words, the radiation efficiency in radiating heat from the core 220 can be improved.

The first and second core members 221 and 222 may be fixed together by a double sided adhesive tape with insulation properties and then fastened by the fastening member. This can improve an adhesion strength of the first and second core members 221 and 222 and a working efficiency during the assembly. In this case, a gap may be ensured by the double sided adhesive tape.

The invention claimed is:

1. A bus bar assembly comprising:
    a magnetic body having at least a first insertion hole and a second insertion hole; and
    a bus bar disposed through the first and second insertion holes, wherein:
    the bus bar is configured so that directions of electrical current flowing therethrough are opposed to each other at least once;
    the magnetic body includes a middle leg in a middle region located between portions of the bus bar, where the directions of current are opposed to each other and end legs in end regions located opposite the middle region with respect to the portions of the bus bar;
    at least the middle leg defines a gap which renders a magnetic field discontinuous, the magnetic field being produced by the current flowing through the bus bar;
    the bus bar is configured to extend through the first insertion hole of the magnetic body from a first side of the magnetic body to a second side opposed to the first side with respect to an extending direction of the bus bar and further through the second insertion hole from the second side to the first side, the middle leg being located between the first and second insertion holes; and
    the bus bar prevents the magnetic body from movement in any direction when the magnetic body is assembled with the bus bar.

2. The bus bar assembly according to claim 1, wherein the bus bar has a substantially uniform sectional area in a part thereof disposed in the first and second insertion holes of the magnetic body.

3. The bus bar assembly according to claim 1, wherein the bus bar includes a part disposed in the first and second insertion holes of the magnetic body, the part being substantially formed into at least one of a C-shape and a U-shape.

4. The bus bar assembly according to claim 1, further comprising:
    a spacer provided in the first and second insertion holes of the magnetic body to insulate the bus bar and the magnetic body from each other; and
    a fastening member fixing the magnetic body to the bus bar thereby to fasten the magnetic body, the bus bar and the spacer together.

5. The bus bar assembly according to claim 4, wherein the fastening member has an engagement portion formed to protrude from an outer periphery thereof, and the engagement portion of the fastening member is engaged with an engagement hole provided in an external member, whereby the fastening member is mounted on the external member.

6. A bus bar assembly comprising:
    a magnetic body having first and second insertion holes;
    a bus bar disposed through the first and second insertion holes;
    a spacer provided in the first and second insertion holes of the magnetic body to insulate the bus bar and the magnetic body from each other; and a fastening member fixing the magnetic body to the bus bar thereby to fasten the magnetic body, the bus bar and the spacer together;

wherein:

the bus bar is configured so that directions of electrical current flowing therethrough are opposed to each other at least once;

the magnetic body includes a middle leg in a middle region located between portions of the bus bar, where the directions of current are opposed to each other and end legs in end regions located opposite the middle region with respect to the portions of the bus bar;

at least the middle leg defines a gap which renders a magnetic field discontinuous, the magnetic field being produced by the current flowing through the bus bar;

the bus bar prevents the magnetic body from movement in any direction when the magnetic body is assembled with the bus bar; and the fastening member has an engagement portion formed to protrude from an outer periphery thereof, and the engagement portion is engaged with an engagement hole provided in an external member, whereby the fastening member is mounted on the external member.

7. The bus bar assembly according to claim 6, wherein the bus bar has a substantially uniform sectional area in a part thereof disposed in the first and second insertion holes of the magnetic body.

8. The bus bar assembly according to claim 6, wherein the bus bar includes a part disposed in the first and second insertion holes of the magnetic body, the part being substantially formed into at least one of a C-shape and a U-shape.

* * * * *